Patented Nov. 11, 1930

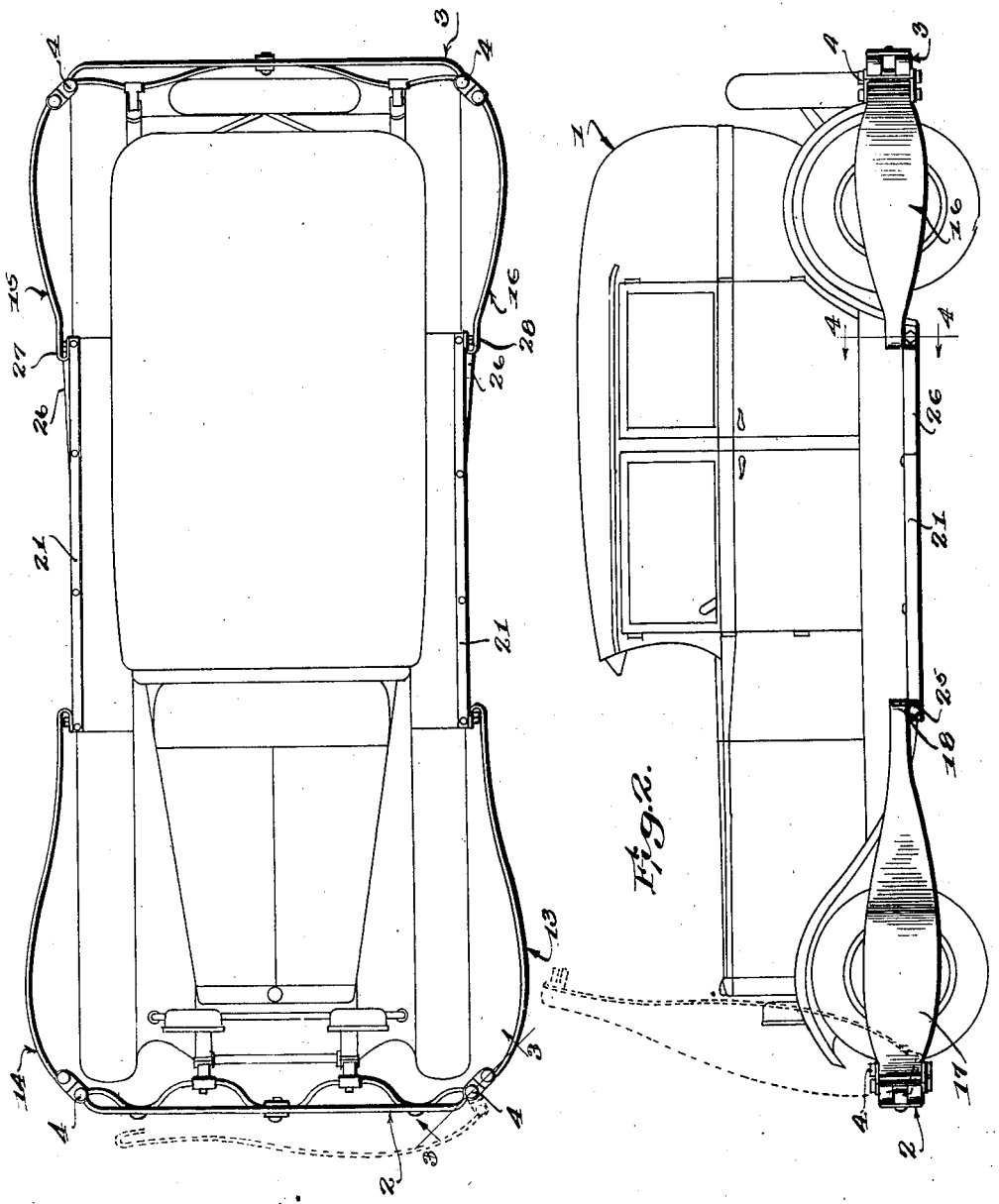

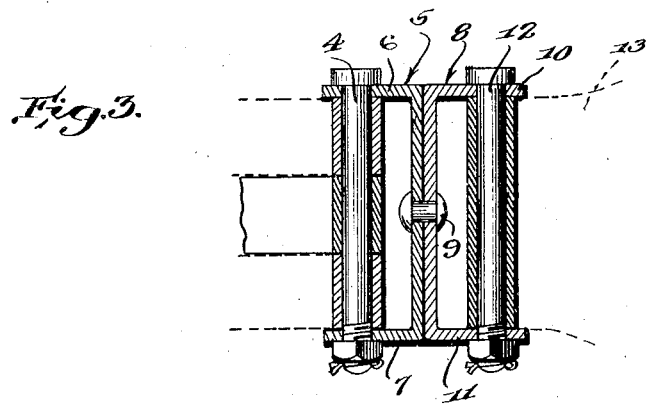
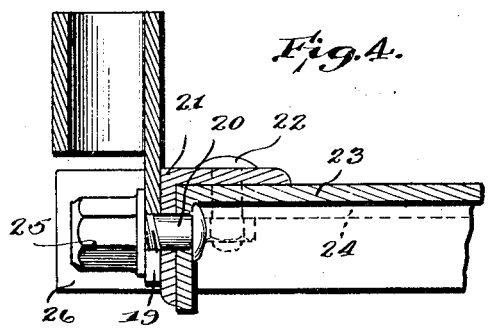
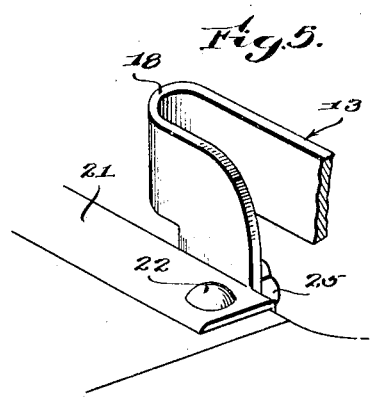
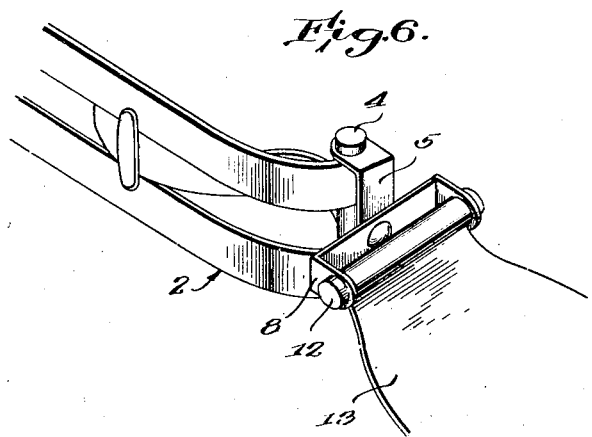

1,780,974

UNITED STATES PATENT OFFICE

VERNE HOSTUTLER, OF HOLLIS, OKLAHOMA

SIDE BUMPER FOR AUTOMOBILES

Application filed October 26, 1929. Serial No. 402,669.

My invention relates to side bumpers for use on vehicles and more particularly for use on automobiles and it consists in the combinations, constructions and arrangements herein described.

An object of my invention is to provide a side bumper which is readily attachable and detachable to the front and rear bumpers for conventional use on present day automobiles.

A further object of my invention is to provide a side bumper that will present a smooth bumping surface along the side of the car throughout the length thereof, without projections therefrom, that will satisfactorily cushion shocks and blows due to "side swiping", without breaking my apparatus.

A further object of my invention is to provide a side bumper whose parts are readily swingable in a number of directions into out-of-the-way positions for enabling the removal and mounting of tires on the wheels, whereby these portions may be moved into out-of-the-way positions, although the vehicle be surrounded by a large number of interfering objects.

A further object of my invention is to provide a device of the type described, which has few parts, is easy to manufacture and will not get out of order easily.

Other objects and advantages will appear as the specification proceeds and the invention will be more particularly defined in the appended claims.

My invention is illustrated in the accompanying drawings forming a part of this specification, in which:

Figure 1 is a top plan view of an automobile equipped with my device having a dotted line view of a movable portion of the device in one of its operative positions, Figure 2 is a side elevational view of my device mounted on an automobile with the dotted line view showing the parts in one inoperative position, Figure 3 is a sectional view on the line 3—3 of Figure 1 with parts thereof shown in elevation, Figure 4 is a sectional view on the line 4—4 of Figure 2 with parts thereof being shown in elevation, Figure 5 is a perspective view of a portion of the device, and Figure 6 is a perspective view of another portion of the device.

In carrying out my invention I make use of an ordinary automobile 1 equipped with the usual front and rear bumpers 2 and 3, respectively.

As is well known a greater number of bumpers both front and rear in use today have vertical bolts 4 on the opposite ends thereof for securing the lengths of spring steel in fixed relation. It is to these bolts that the movable portions of my device are secured.

To each of these bolts 4 I secure the swinging bracket members 5 having the projecting ears 6 and 7 thereon for engagement with said bolt members adjacent the top and bottom thereof. Pivoted centrally to these bracket members 5 are the similar bracket members 8, suitable pivot means 9 being used to secure these bracket members in pivotal relation. These bracket members 8 are similarly provided with ear members 10 and 11 for pivotal engagement with bolt members 12, as more clearly appears from an examination of Fig. 3. Suitably mounted on the bolts 12 intermediate the ends thereof are the bumper or cushioning members 13, 14, 15 and 16.

These bumping members each have an enlarged portion, as at 17, for suitably and amply protecting the hubs and wheels of an automobile, and taper off at the ends to suitable connections, generally indicated at 18, for securing said ends in fixed relation when the bumpers are mounted in operative position. The ends of these bumpers curve inwardly as shown more clearly in Figure 5 having the bifurcated portion 19 on the inner extension thereof adapted to engage a bolt member 20 which is burred so that it remains in place, as appears in Figure 4.

For protecting the outer edge of each running board a sheet of angle iron or channel beam 21 is mounted thereabout as appears in Figure 4. This protecting sheet is secured to the running board by bolts and nuts 22 engaging said sheet through the running board 23 and the supporting brackets shown in dotted lines, at 24, in Fig. 4. The bolt 20 further secures this protecting sheet 21 to the running board. Engaging said bolt 20 for securing the bifurcated end 19 of the movable bumping member in place I provide a nut 25 which is of the same size and shape as the nuts used for securing the tires on the wheels. The protecting sheet or strip 21 for the running boards has an enlarged portion 26, providing a projection of increasing size for the protection of the rear locking means shown at 27 and 28 in Figure 1, and further providing in conjunction with the rear bumpers 15 and 16 a smooth bumping surface adapted to sheer off from abutting vehicles when encountering that form of collision known as "side swiping".

From the above description the use and operation of my device is readily understood. In mounting the bumper on automobiles having front and rear bumpers such as shown at 2 and 3, the protecting strip 21 is first secured to each of the running boards 23 in a manner as set forth in connection with Figure 4. The members 13, 14, 15 and 16 having the swivelly mounted brackets 8 and 5 thereon are then secured to the bolt members 4 in the outer ends of each set of springs. The bumping members 13, 14, 15 and 16 are then swung into engagement by means of their connecting ends 18 having the bifurcated connecting means 19 thereon with the bolt members 20 projecting from the strip members 21. The nuts 25 are then screwed on the bolts 20, whereupon the device is set up in operative position.

When it is desired to remove a tire or perform some other operation on the wheels or on the trucking of the automobile, necessitating the displacement of the bumping members, the operator loosens the nuts 25 and swings the bumping members 13, 14, 15 and 16 to the side below, above, or in any intermediate direction as required by the position of obstructing matter in the vicinity of the automobile which would not allow movement of said bumping members in certain directions. This substantially universal movement in directions away from the car is readily permitted by the swivel connections on bolts 12 and 4, which permit movement about a perpendicular axis and by pivot means 9 which permit movements between said pivot bolts about an axis transverse thereto. The necessary repairs or other operations can then be made, after which the bumping members 13, 14, 15 and 16 can be easily swung back into operative position. The dotted line views in Figures 1 and 2 clearly show two positions of my device when moved out of the way.

It can be readily seen that I have provided a side bumper, the breakable parts of which, such as nut and bolt means 25 and 20, are suitably protected by projecting portions of the movable spring members and the enlarged portion 26, and that in the event of "side swiping", the colliding vehicle, if engaging the front portion of my device, will slide along the side of the car equipped with my device, engaging the protecting sheet 21, the enlarged portion 26 thereon and the spring cushioning portions of the rear spring rather than the bolt connecting means of said spring.

It can also be seen that the parts of my device which it is necessary to replace when repairing tires, etc., can be moved into an out-of-the-way position in any of a plurality of directions, thereby allowing such movement into an out-of-the-way position under conditions where surrounding objects prevent movement in certain directions, such as garages, adjacently positioned automobiles, etc. It is also seen that during the unfastening of the nuts 25 for permitting the movable members to be swung in an out-of-the-way position the ordinary tire wrench can be used to loosen the nut members 25.

It is further seen that in the event of the bumping members 13, 14, 15 and 16 being forced by an engaging object into the hubs of the wheels, said hub will not engage the working parts of said bumping members but will merely be pressed into close relation with their inner surfaces.

I claim:

1. In a motor vehicle, transverse bumpers extending across the front and rear of the vehicle, side bumpers extending along the entire sides of said vehicle and having intermediate and end portions, means for fixedly supporting said intermediate portions, a universal joint connecting said end portions to the ends of said transverse bumpers, and means for detachably securing said end portions in fixed position.

2. In a motor vehicle, transverse bumpers extending across the front and rear of the vehicle, side bumpers extending along the entire sides of said vehicle and having intermediate and end portions, means for fixedly supporting said intermediate portions, means for pivotally connecting said end portions to the ends of said transverse bumpers, and means for detachably securing said end portions in fixed position, comprising inwardly extending bifurcated parts on said end portions, and bolt and nut means mounted in said intermediate portions for engagement with said bifurcated parts.

3. In a motor vehicle, transverse bumpers extending across the front and rear of said vehicle, movable side bumpers extending between said transverse bumpers and the running boards of said vehicle, means for connecting said movable side bumpers to said running board, and means mounted on said running board for shielding said running board, said running board shields being of gradually increasing cross section toward the rear.

4. A side bumper for motor vehicles adapted to present a continuous bumping surface along the entire side of the vehicle, comprising a plurality of interconnected bumping members, said connections being situated behind said bumping surface.

5. In a motor vehicle, a stationary bumper consisting of a plurality of co-extensive bumping members, a bolt connecting the members at each of the ends, a bracket swivelled on said bolt, a movable bumping element mounted for universal movement on said bracket and means for securing said movable bumping element in operative position.

6. A shield for the protection of automobile running boards and the like comprising an elongated strip, of variable cross sectional area to provide a bumping surface of variable contour and strength.

7. A shield for the protection of automobile running boards and the like comprising an elongated strip of progressively variable cross-sectional area to present an outwardly-flared bumping surface.

8. In a motor vehicle, a stationary bumper consisting of a plurality of co-extensive bumping members, a bolt connecting the members at each of the ends, a bracket swivelled on said bolt, a second bracket swivelled on said first named bracket, a movable bumping element swivelled on said second named bracket, and means for securing said movable bumping element in operative position.

VERNE HOSTUTLER.